United States Patent [19]
Liu

[11] Patent Number: 5,833,850
[45] Date of Patent: Nov. 10, 1998

[54] WATER FILTER

[76] Inventor: Hsin Fa Liu, P.O. Box 82-144, Taipei, Taiwan

[21] Appl. No.: 912,189

[22] Filed: Aug. 15, 1997

[51] Int. Cl.$^6$ .......................... B01D 27/14; B01D 27/08; B01D 24/18
[52] U.S. Cl. .......................... 210/232; 210/238; 210/282; 210/288; 210/289; 210/323.2; 210/335; 210/339
[58] Field of Search .................................... 210/232, 238, 210/282, 288, 289, 323.2, 335, 339

[56] References Cited

U.S. PATENT DOCUMENTS 5,110,479 5/1992 Frommer .
5,188,727 2/1993 Kurth .
5,454,944 10/1995 Clack .
5,700,371 12/1997 Koslow .

Primary Examiner—Thomas M. Lithgow
Attorney, Agent, or Firm—A & J

[57] ABSTRACT

A water filter includes a housing, a base adapted to engage with a lower end of the housing, two filtering cores each having a cylindrical casing threadedly connected with an upper circular cover and a lower circular cover, the lower circular cover having a threaded circular shoulder depending downwardly therefrom and a tubular neck having an upper end extending upwardly from the threaded circular shoulder and a lower end extending downwardly from the threaded circular shoulder, a first seat formed with an inner neck and an outer neck and arranged in a respective recess of the base, and a second seat formed with an second inner neck and an second outer neck and fitted into a respective recess of the base, whereby the water filter will provide two circulation cycles for purifying water.

2 Claims, 6 Drawing Sheets

WATER FILTER

BACKGROUND OF THE INVENTION

1. Field of the Invention

This invention is related to an improved water filter.

2. Description of the Prior Art

The conventional water filter (see FIG. 1) includes a filtering core A1 enclosed within a plastic holder A2, a housing A3 for receiving the plastic holder A2, a cover A31 engaged with the top of the housing 31 and having an inlet A32 and an outlet A33, a filtering cotton member A4 arranged in the lower end of the plastic holder A2, and a plurality of perforations A21 formed on the bottom of the plastic holder A2. However, once the filtering core A1 cannot be used any more, the filtering core A1 must be disposed of together with the plastic holder A2 thereby wasting material and therefore causing environmental problems.

Hence, a water filter with a filtering core B1 in which the filtering material B2 can be refilled has been developed to obviate this drawbacks. Nevertheless, such a water filter can provide only one circulation cycle for purifying water. In addition, the small particles of the filtering material may flow through the sponge B3 to damage the user's health.

Therefore, it is object of the present invention to provide an improved water filter which can obviate and mitigate the above-mentioned drawbacks.

SUMMARY OF THE INVENTION

This invention is related to an improved water filter.

It is the primary object of the present invention to provide a water filter which can effectively remove impurities from the water.

It is another object of the present invention to provide a water filter which has a plurality of filtering cores.

It is still another object of the present invention to provide a water filter which is simple in construction.

It is still another object of the present invention to provide a water filter of which the filtering cores are replaceable.

It is a further object of the present invention to provide a water filter which is fit for practical use.

The foregoing objects and summary provide only a brief introduction to the present invention. To fully appreciate these and other objects of the present invention as well as as the invention itself, all of which will become apparent to those skilled in the art, the following detailed description of the invention and the claims should be read in conjunction with the accompanying drawings. Throughout the specification and drawings identical reference numerals refer to identical or similar parts.

DETAILED DESCRIPTION OF THE PREFERRED EMBODIMENT

Figure 1:
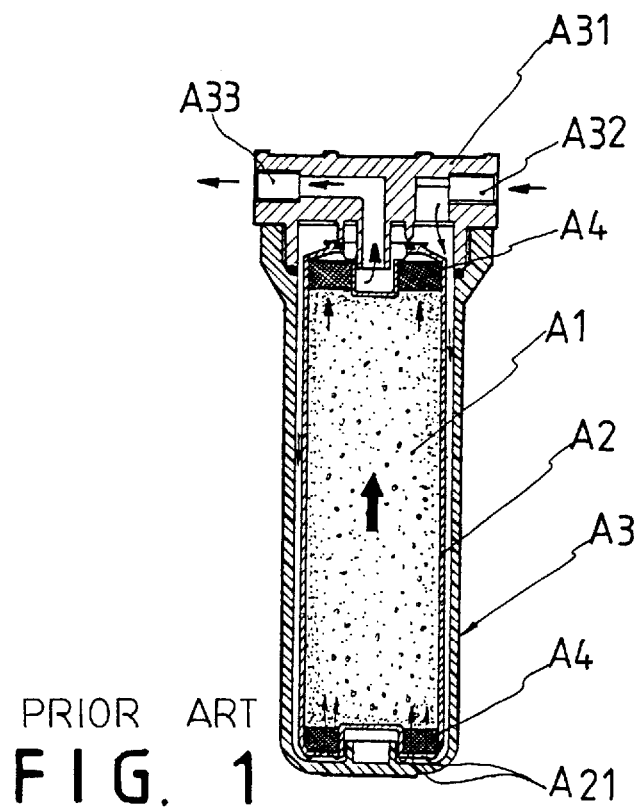
FIG. 1 is a sectional view of a prior art water filter.
Figure 2:
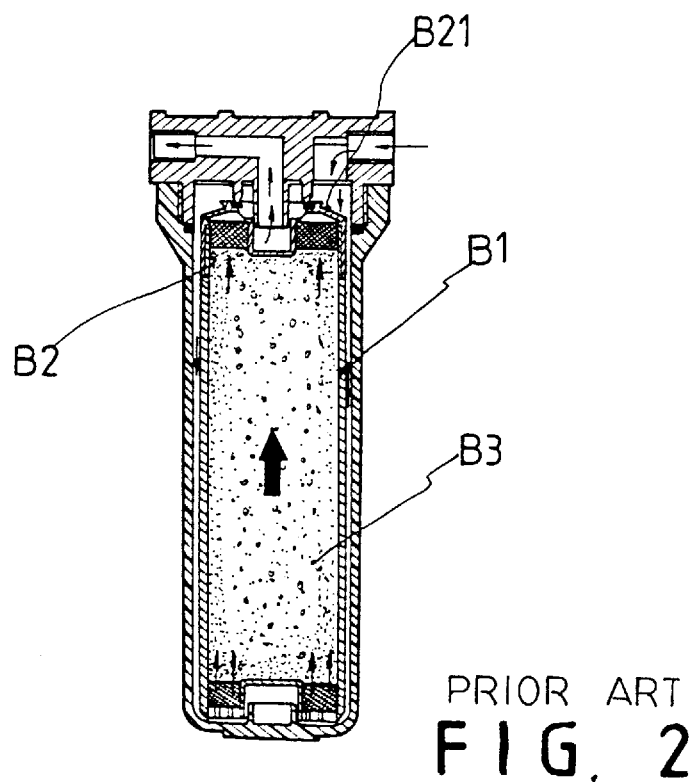
FIG. 2 is a sectional view of another prior art water filter.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
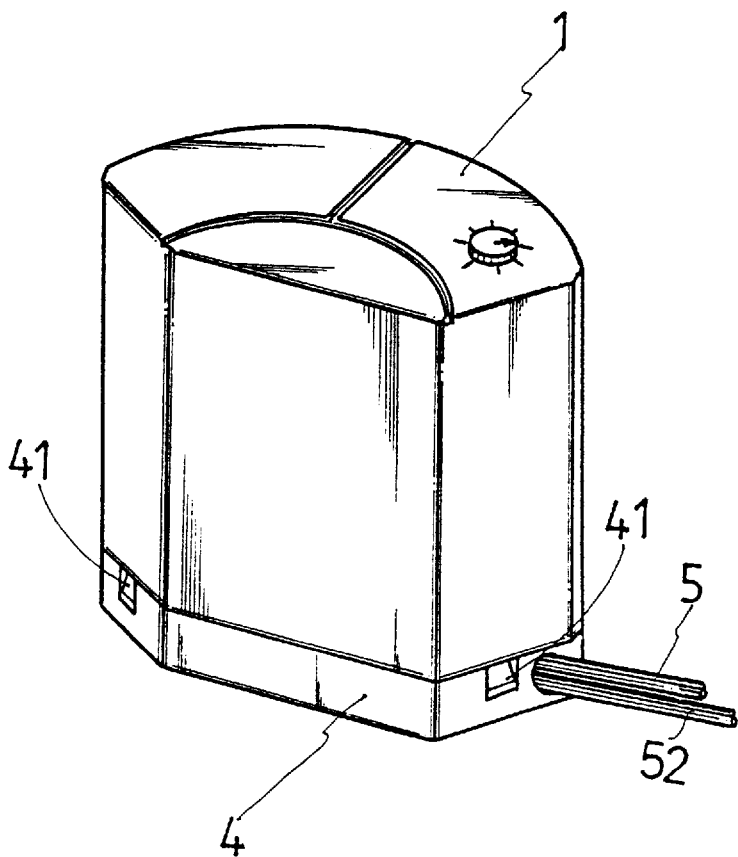
FIG. 3 is a perspective view of the present invention.
Figure 4:
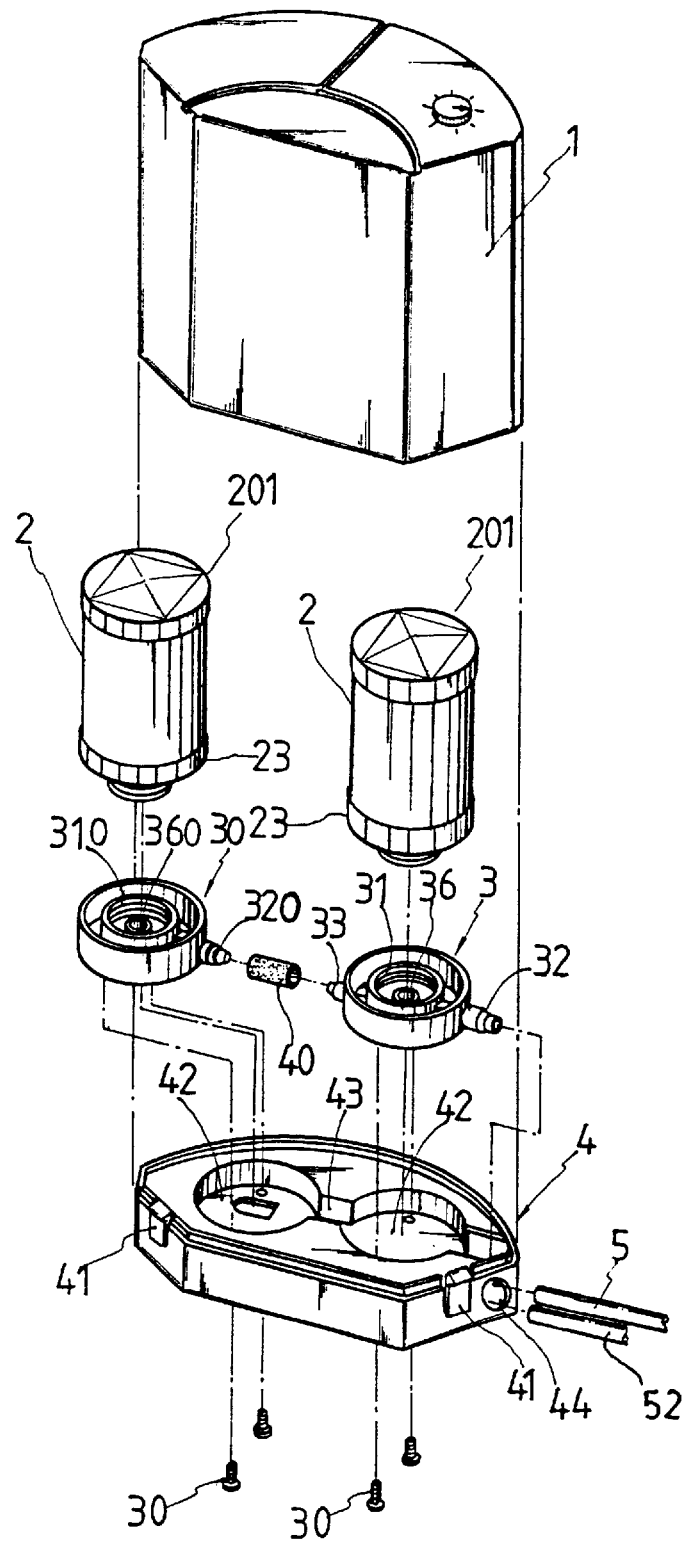
FIG. 4 is an exploded view of the present invention.

With reference to the drawings and in particular to FIGS. 3 and 4 thereof, the water filter according to the present invention generally comprises a housing 1, two filtering cores 2, a right seat 3, a left seat 3 and a base 4.

The housing 1 is adapted to fit on the base 4. The base 4 is provided with two opposite resilient hooks 41 adapted for engaging the lower edge of the housing thereby keeping the housing 1 in place. The top of the base 1 is formed with two circular recesses 42 and a passage 43 communicating the two circular recesses 42. An end of the base 1 has an opening 44.

Figure 5:
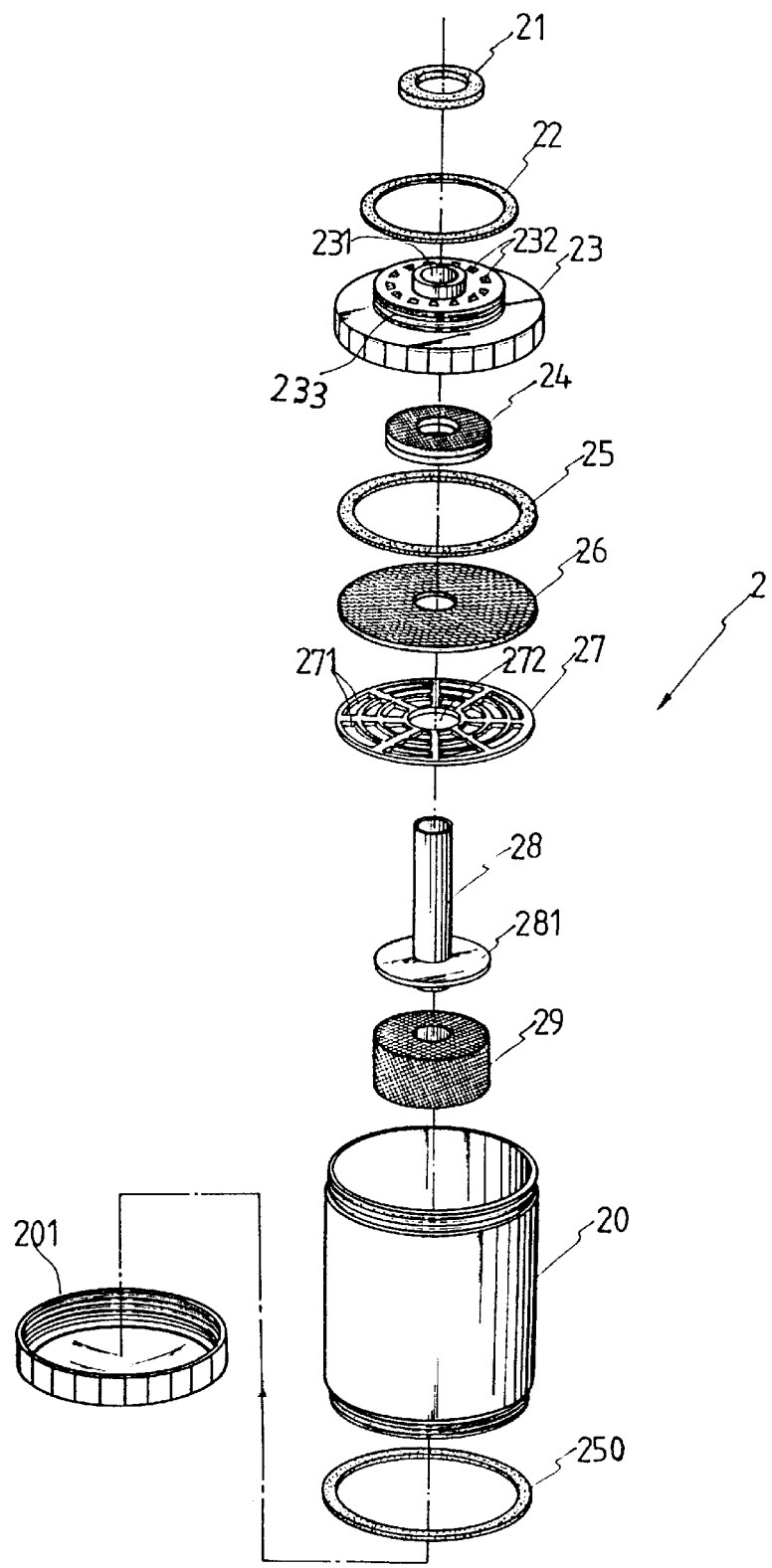
FIG. 5 is an exploded view of a filtering core.
Figure 6:
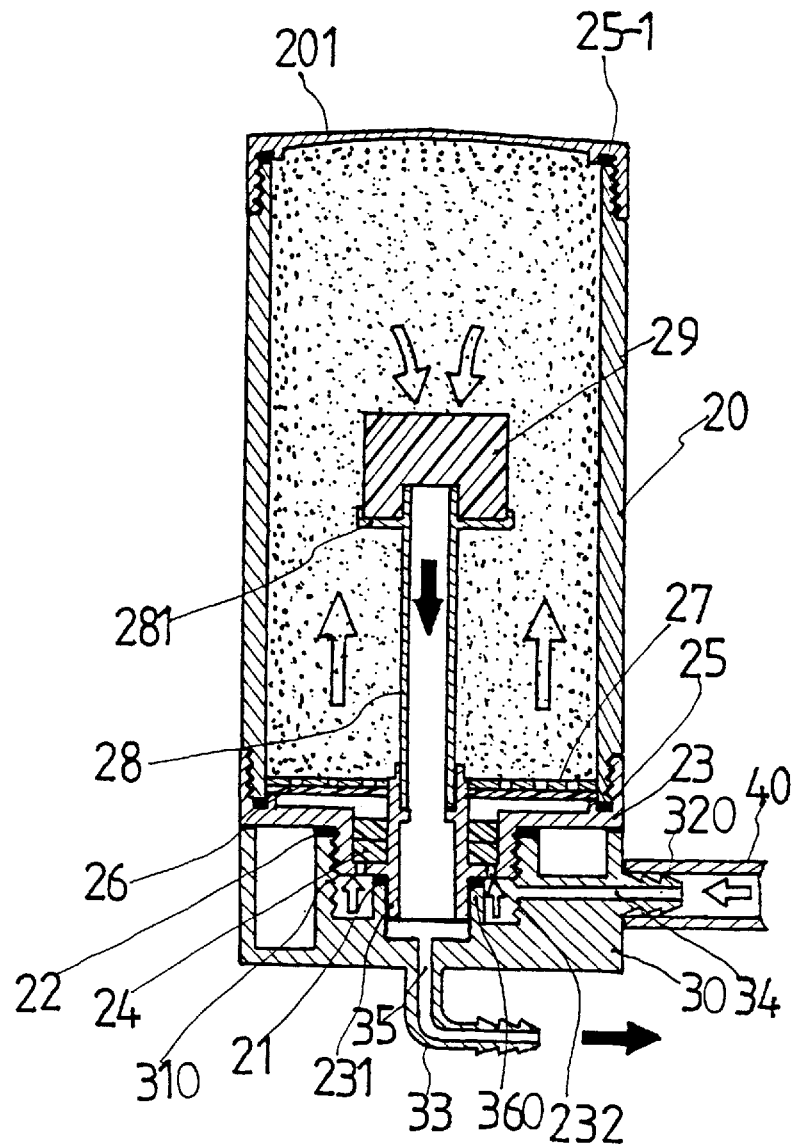
FIG. 6 is a sectional view of the left filtering core and the left seat.

As shown in FIGS. 5 and 6, the filtering core 2 includes a cylindrical casing 20 threadedly connected with an upper circular cover 201 and a lower circular cover 23. The lower circular cover 23 has a threaded circular shoulder 233 depending downwardly therefrom and a tubular neck 231 having an upper end extending upwardly from the threaded circular shoulder 233 and a lower end extending downwardly from the threaded circular shoulder 233. The tubular neck 231 has a smaller diameter than the threaded circular shoulder 233. A small annular ring-like cotton member 24 is fitted over the upper end of the tubular neck 231 of the threaded circular shoulder 233. A large annular ring-like cotton member 26 is also fitted over the upper end of the tubular neck 231 of the threaded circular shoulder 233 and disposed above the small annular ring-like cotton member 26. A circular net 27 having a plurality of meshes 271 and a center hole 272 is fitted over the upper end of the tubular neck 231 of the threaded circular shoulder 233 and arranged on the large annular ring-like cotton member 27. A tubular member 28 is inserted into the upper end of the tubular neck 231 of the threaded circular shoulder 233 at its lower end. The upper end of the tubular member 28 has a circular flange 281 on which is mounted a foamed filtering member 29. A first packing 251 is fitted between the upper circular cover 201 and the upper end of the cylindrical casing 20. A second packing 25 is fitted between the lower end of the cylindrical casing 20 and the lower circular cover 233.

The right seat 3 is a circular member formed with an inner neck 36 and an outer neck 31. The outer neck 31 of the right seat 3 is dimensioned and threaded to engage with the threaded circular shoulder 233 of the lower circular cover 233 of the filtering core 2, while the inner neck 36 of the right seat 3 is sized to receive the lower end of the tubular neck 231 of the threaded circular shoulder 233. The right seat 3 is provided with a horizontal inlet 32 at one side and a horizontal outlet 33. An inlet pipe 52 extends through the opening 44 of the base 4 to connect with the horizontal inlet 32 of the right seat 3.

The left seat 30 is a circular member formed with an inner neck 360 and an outer neck 310. The outer neck 310 of the left seat 30 is dimensioned and threaded to engage with the threaded circular shoulder 233 of the lower circular cover 233 of the filtering core 2, while the inner neck 360 of the left seat 30 is sized to receive the lower end of the tubular neck 231 of the threaded circular shoulder 233. The left seat 30 is provided with a horizontal inlet 320 opposite to the horizontal outlet 33 of the right seat 3. The left seat 30 has an outlet 35 which communicates with the inner neck 36 and extends downwardly through the bottom of the left seat 3 to engage with an outlet pipe 5.

The two seats 3 and 30 are fitted into respective recesses 42 of the base 4. A pipe 40 is connected between the inlet 320 of the left seat 30 and the outlet 33 of the right seat 3.

Figure 7:
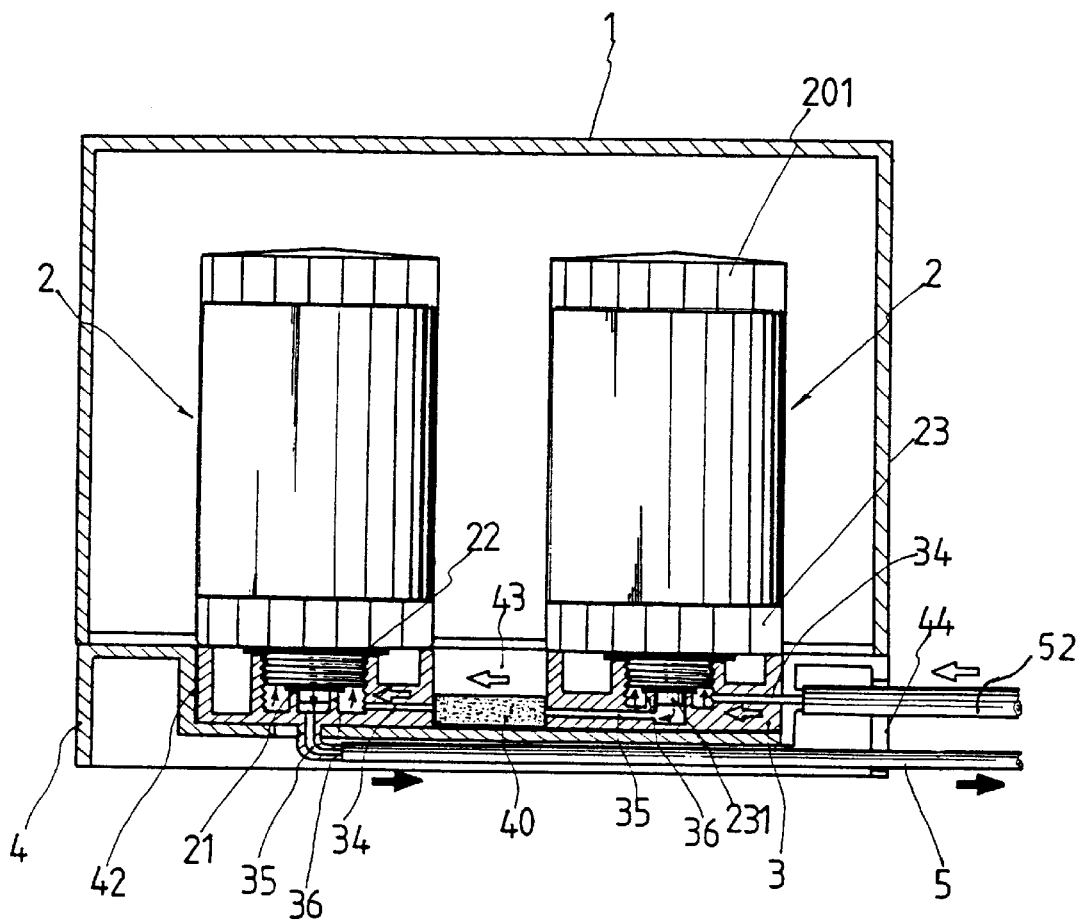
FIG. 7 illustrates the working principle of the present invention.

When in use, water first flows through the filtering core 2 at the right side (with respective to FIG. 7) via the inlet pipe 51 and then the filtering core 2 at the left side through the pipe 40. Thereafter, the water will flow out of the filtering core 2 at the left side via the outlet pipe 51. Before the water flows out of the filtering core 2, the water will be filtered by the small annular ring-like cotton member 24, the large annular ring-like cotton member 26, the net 27, and the foamed filtering member 29 thereby removing thereby removing almost all impurities from the water.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A water filter comprising:

a housing;

a base adapted to engage with a lower end of said housing and having two circular recesses and a passage communicating said two circular recesses and an opening at an vertical side thereof;

two filtering cores each including a cylindrical casing threadedly connected with an upper circular cover and a lower circular cover, said lower circular cover having a threaded circular shoulder depending downwardly therefrom and a tubular neck having an upper end extending upwardly from said threaded circular shoulder and a lower end extending downwardly from said threaded circular shoulder, said tubular neck having a smaller diameter than said threaded circular shoulder, a small annular ring-like cotton member fitted over said upper end of said tubular neck of said threaded circular shoulder, a large annular ring-like cotton member fitted over said upper end of said tubular neck of said threaded circular shoulder and disposed above said small annular ring-like cotton member, a circular net fitted over said upper end of said tubular neck of said threaded circular shoulder and arranged on said large annular ring-like cotton member, a tubular member inserted into said upper end of said tubular neck of said threaded circular shoulder at a lower end thereof, said upper end of the tubular member having a circular flange on which is mounted a foamed filtering member;

a first seat formed with an inner neck and an outer neck, said outer neck being dimensioned and threaded to engage with said threaded circular shoulder, said inner neck being sized to receive the lower end of said tubular neck, said first seat being provided with a horizontal inlet and a horizontal outlet, an inlet pipe extending through said opening of said base to connect with said horizontal inlet, said first seat being fitted into a respective recess of said base; and a second seat formed with an second inner neck and an second outer neck, said second outer neck being dimensioned and threaded to engage with said threaded circular shoulder, said second inner neck being sized to receive the lower end of said tubular neck, said second seat being provided with a horizontal inlet and a vertical outlet, an outlet pipe extending through said opening to connect with said vertical outlet, said second seat being fitted into a respective recess of said base.

2. The water filter as claimed in claim 1, further comprising a first packing arranged between said upper cover and an upper end of said cylindrical casing and a second packing fitted between said lower cover and a lower end of said cylindrical casing.

* * * * *